(12) United States Patent
Trapp et al.

(10) Patent No.: US 11,636,736 B2
(45) Date of Patent: Apr. 25, 2023

(54) EVENT BASED GAMBLING METHOD WITH DECREASED HOUSE LIABILITY

(71) Applicants: Bear Trapp, Regina (CA); Ray Derges, Regina (CA)

(72) Inventors: Bear Trapp, Regina (CA); Ray Derges, Regina (CA)

(73) Assignee: 102124067 SASKATCHEWAN LTD., Regina (CA)

( * ) Notice: Subject to any disclaimer, the term of this patent is extended or adjusted under 35 U.S.C. 154(b) by 242 days.

(21) Appl. No.: 17/182,484

(22) Filed: Feb. 23, 2021

(65) Prior Publication Data

US 2022/0051527 A1 Feb. 17, 2022

(51) Int. Cl.
*G06Q 20/18* (2012.01)
*G07F 17/32* (2006.01)
*G06Q 20/04* (2012.01)
*G06Q 50/34* (2012.01)
*G06F 16/2457* (2019.01)
*G06Q 20/32* (2012.01)

(52) U.S. Cl.
CPC .... *G07F 17/3288* (2013.01); *G06F 16/24578* (2019.01); *G06Q 20/0457* (2013.01); *G06Q 20/18* (2013.01); *G06Q 20/322* (2013.01); *G06Q 50/34* (2013.01); *G07F 17/3258* (2013.01)

(58) Field of Classification Search
CPC . G07F 17/3288; G07F 17/3258; G06Q 20/18; G06Q 50/34
See application file for complete search history.

(56) References Cited

U.S. PATENT DOCUMENTS

| | | | |
|---|---|---|---|
| 2007/0293305 A1* | 12/2007 | Amour | G06Q 20/20 463/25 |
| 2015/0262456 A1* | 9/2015 | Shore | G07F 17/3244 463/25 |
| 2016/0210815 A1* | 7/2016 | Holt | G07F 17/329 |
| 2020/0273295 A1* | 8/2020 | Visser | G07F 17/3269 |

* cited by examiner

*Primary Examiner* — James S. McClellan
(74) *Attorney, Agent, or Firm* — Nixon & Vanderhye, P.C.

(57) ABSTRACT

An electronically-facilitated event-based sports pool with decreased house liability. Pool tickets are sold in respect of each scoring interval in the subject sports competition to purchasors, each corresponding to a potential subject sports competition outcome and wager amount. Following a scoring interval if no successful wagers/pool tickets were sold, the pot is reserved for the next scoring interval. If there are no paying wagers identified in the last chronological scoring interval in the subject sports competition, the total wager pool including any retained player proceeds portion from the chronologically preceding scoring interval are retained by the operator of the pool. The system and method can be integrated with pre-existing results tracking and account funding systems, for easy integration into existing gaming outlets.

31 Claims, 6 Drawing Sheets

Drive for Dough

| Cost | Kansas City Chiefs | | | |
|------|------|------|------|------|
| $20 | Tyreek Hill WR | Travis Kelce TE | Damien Williams RB | Field Goal |
| $10 | Mecole Hardman WR | Sammy Watkins WR | LeSean McCoy RB | |
| $5 | Patrick Mahomes QB | DeMarcus Robinson WR | Defensive/Sp Teams Points | |

| Cost | Baltimore Ravens | | | |
|------|------|------|------|------|
| $20 | Mark Ingram RB | Lamar Jackson QB | Mark Andrews TE | Field Goal |
| $10 | Marquise Brown WR | Willy Snead WR | Gus Edwards RB | |
| $5 | Hayden Hurst TE | Nick Boyle TE | Defensive/Sp Teams Points | |

FIGURE 1

Sample outcome records:

| ID 20 | Game 21 | Interval 22 | Wager event type 23 | Wager event 23 | Wager amount 24 |
|---|---|---|---|---|---|
| 1 | 1 | 1 | Team | Field goal | $20 |
| 2 | 1 | 1 | Team | Defensive/Special teams pts | $5 |
| 3 | 1 | 1 | Player | Hill WR | $20 |
| 4 | 1 | 1 | Player | Kelce TE | $20 |
| 5 | 1 | 1 | Player | Williams RB | $20 |
| 6 | 1 | 1 | Player | Hardman WR | $10 |
| 7 | 1 | 1 | Player | Watkins WR | $10 |
| 8 | 1 | 1 | Player | McCoy RB | $10 |
| 9 | 1 | 1 | Player | Mahomes QB | $5 |
| 10 | 1 | 1 | Player | Robinson WR | $5 |
| 11 | 1 | 1 | Team | Field goal | $20 |
| 12 | 1 | 1 | Team | Defensive/Special teams pts | $5 |
| 13 | 1 | 1 | Player | Ingram RB | $20 |
| 14 | 1 | 1 | Player | Jackson QB | $20 |
| 15 | 1 | 1 | Player | Andrew TE | $20 |
| 16 | 1 | 1 | Player | Brown WR | $10 |
| 17 | 1 | 1 | Player | Snead WR | $10 |
| 18 | 1 | 1 | Player | Edwards RB | $10 |
| 19 | 1 | 1 | Player | Hurst TE | $5 |
| 20 | 1 | 1 | Player | Boyle TE | $5 |

FIGURE 7

Sample ticket records:

| ID 30 | Outcome 20 | Purchaser details 31 |
|---|---|---|
| 1 | 1 | John Smith |
| 2 | 1,3,9 | Tom Brown |
| 3 | 12 | Chris Jones |
| 4 | 12,15 | Tanya Wall |

FIGURE 8

EVENT BASED GAMBLING METHOD WITH DECREASED HOUSE LIABILITY

CROSS-REFERENCE TO RELATED APPLICATIONS

This application claims priority to CA Serial No. 3,089,845 filed Aug. 12, 2020, the entire content of which is hereby incorporated by reference.

This invention is in the field of electronic systems for sports-based wagering, and more specifically discloses a system for the vending, verification and redemption of a sports pool lottery.

BACKGROUND

Wagering in relation to interval or final outcomes in sporting matches is a favourite pastime for many, and in a properly regulated environment provides abilities for charitable fundraising, group betting, and income opportunities for the operator. One of the most popular methods of sports-based wagering is the operation sports pool lotteries, which consists of the sale of tickets corresponding to game based outcomes (typically final scores etc.)—sports pools are popular and widely used. Typically the winner of a sports pool wins a predetermined portion of the total wager pool pot collected in ticket sales, and the operator of the pool typically keeps a portion of the proceeds.

Sports pools have become a popular pastime for friends and co-workers to bet on various sporting activities. A paper-based sports pool for a single two team sporting match consists of creating a matrix of possible scores for each team, each representing a unique outcome for the game, and then effectively individuals choose one or more squares in the matrix on which they will be the pool participant. However a paper-based pool of this nature is not intended for an audience of any size or for repeated wagering at higher velocity related to intervals in a sporting competition.

Because of the availability of electronic lottery systems and infrastructure, a system which would allow for the fulfilment and sales of an electronically facilitated sports event based pool lottery would provide solid revenue opportunities. However an electronically facilitated sports pool ottery, in which no winner is guaranteed, would be maximized in commercial opportunity if it also addressed other current shortcomings in the prior art operation of paper-based and basically configured electronic sports pool ticket sales.

One of the other current limitations to sports pool based lotteries is related to the type of bets typically permitted. For example, outcomes on which tickets are current typically sold relate to a matrix of final game scores. If there were additional types of wagers which could be placed on in-game events or plays etc., this would increase the participant excitement level and saleability of an electronically facilitated sports pool based lottery. For example, if a participant could bet on their favourite player scoring, a particular type of scoring play occurring etc., in addition to or in place of scores etc.

Finally, another limitation which if removed would minimize house liability, or conversely maximize operator revenue, would be to find a way of increasing the volume and velocity of bets which can be placed within or in relation to a particular sporting competition, beyond a single set of wagers corresponding to a matrix of final score outcomes as has been the case in prior art circumstances.

If it were possible to provide a high speed means of wagering on various types of scoring outcomes within a sporting competition that resulted in a higher number of wagers being placed and in which payouts were limited to wagers being placed on occurring outcomes, operator profit could be maximized and/or liability reduced.

SUMMARY OF THE INVENTION

As outlined, the invention comprises an electronically facilitated event-based sports pool method with increased house profitability or decreased house liability. The invention accomplishes its objectives by permitting the sale of wagers or pool tickets in respect of multiple scoring intervals in a multi-team sporting event each corresponding to a potential competition outcome and wager amount. The competition outcomes which the method of the present invention will permit for wagering purposes comprise a broader category of potential outcomes allowing for added wagering opportunities than those of the prior art, which will permit for increased velocity and wagering volume in the method.

Pool outcomes will be determined based upon wagers placed on various competition outcomes for each scoring interval in the subject sports competition and if no winning wagers were placed in a particular scoring interval the house or operator fee portion will be paid and the remainder of the pot carried forward to the next chronologically adjacent scoring interval. If no winning wagers exist in the final scoring interval of the subject sports competition, the entire remaining pot defaults to the house or operator of the pool.

The invention, a method of conducting electronically facilitated event-based sports pool with decreased house liability in conjunction with a subject sports competition comprised of two multiplayer teams competing within a plurality of intra-game scoring intervals uses a ticketing server. The ticketing server comprises a network connection which permits communication of the ticketing server with client devices of pool ticket purchasers, along with a ticketing software component for administering the method and communicating with client devices to facilitate the pool of tickets. The ticketing server also hosts or is operatively connected to an outcome database which is comprised of a plurality of outcome records each corresponding to a potential wager event for a team or a player of the team within a scoring interval in the subject sports competition. There is at least one outcome record for each scoring interval of the subject sports competition, and there is a wager value assigned to each outcome record. Each wager event could comprise a team scoring outcome, a player scoring outcome, or some other statistic related occurrence within the subject sports competition in respect of which it was desired to permit the ability to purchase pool tickets for wagering purposes within the overall pool being operated in accordance with the remainder of the method. The various types of wager events which could be represented by the outcome records will be understood to those skilled in the art of sports based wagering and similar operations and all such potential wager events are intended to be encompassed within the scope of the present invention.

The server would include purchaser interface to an account funding system, which would be a connection to a payment processing gateway or the like through which wager payments and winning wager amounts can be received, processed and dispersed on behalf of individual purchasers of pool tickets in accordance with the remainder of the method.

The ticketing server would also be operatively connected to or host a ticket database comprised of a plurality of ticket records each of which corresponded to a pool ticket sold. Each pool ticket sold would correspond to an outcome record and a wager value, and would include purchaser details corresponding to a payment method by which successful wager amounts can be paid out to be paid to the purchaser of the pool ticket corresponding to that record.

The method would comprise selling pool tickets in respect of each scoring interval in the subject sports competition to purchasers up until the time of commencement of that scoring interval. The scoring interval is intended to encompass an intra-game interval of time, versus the entire length of the subject sports competition, permitting for an increase in the frequency and number of tickets or wagers to be placed and enhancing the value of the pools collected as well as enhancing the value of the operator fee portion. In respect of each pool ticket sold the ticketing server would communicate with a client device and the account funding system as required, to capture the purchaser details corresponding to the purchaser and allow the purchaser to select at least one potential wager event related to an outcome record for at least one yet to commence scoring interval. The price of the wager associated with each outcome record could be preset, or in some embodiments of the method the purchaser could place a wager in an amount of their choosing. Both such approaches are contemplated within the scope of the present invention. Following the completion of wager selection, the finalization of a ticket purchase transaction would be completed by the account funding system—issuing a ticket identifier or the like, or otherwise logging the details of the wager selections made and providing the purchaser with serial identifier or other details as might be required to potentially redeem the purchased ticket or wagers in the future if they are calculated to pay. Each ticket purchase would be associated with the corresponding outcome record (s) and payment for the aggregate wager amounts of all of the associated outcome records associated with the ticket purchased by the purchaser would be captured from the purchaser via a payment transaction between the client device and the server, and the account funding system. The sold ticket particulars of the sold ticket would be stored to a ticket record in the ticket database. The ticket records would need to add a minimum include sufficient information to permit refund of successful wager proceeds to the purchaser of a particular ticket via the account funding system.

It is specifically contemplated that the account funding system would in most cases be a pre-existing account system or payment gateway within a pre-existing sports book operation, whereby users who already had user accounts for the purchase of particular wagers from an electronic sports book or wish to create an account for interaction with the electronic sports book who might offer the wagering method of the present invention along with others could participate and purchase and redeem tickets and wagers in the scope of the method of the present invention or otherwise. In other cases it may be the case that the account funding system of a standalone embodiment of the server and method of the present invention may contain an integral account funding system software component or connection to a credit card payment gateway or the like, which would allow also for the practice of the method of the present invention. Both such approaches are contemplated within the scope hereof.

The pool tickets being sold could correspond to more than one scoring interval, permitting the ticket purchaser to either purchase a ticket in respect of an individual scoring interval yet to commence, or to permit the purchaser to proactively place wagers in respect of potential wager events in multiple yet to commence scoring intervals with one ticket purchase. All such approaches are contemplated to be within the scope of the present invention. It will also be understood that a pool ticket could be purchased in respect of multiple potential wager events in a single scoring interval i.e. a ticket purchaser can place multiple bets with respect to multiple potential wager events which could occur in a single scoring interval in the subject sports competition. A ticket purchaser might also wish to purchase the same bets across multiple scoring intervals which the method could also facilitate i.e. it may be desired by a purchaser to place wagers in respect of the same potential wager events across all of the scoring intervals of a particular game.

Where it was desired to provide a set of potential wager events represented by outcome records in the outcome database, in certain embodiments of the method, the same outcome records could be used for more than one or all scoring intervals in the subject sports competition. In other embodiments, different potential wager events within scoring intervals in the subject sports competition could be used.

The scoring intervals themselves could be a predefined period of time within the subject sports competition, or could correspond to intra-game scoring intervals or periods of time as might be defined in the rules of the game—for example in a hockey game there are three 20-minute periods or in a football game there are four 15-minute quarters, and the scoring intervals could correspond to the periods, quarters, or any other type of predefined scoring interval.

The scoring intervals can also be defined in respect of the subject sports competition specifically in respect to the method—for example the operator of the method could prescribe a period of time comprising the scoring intervals within a particular subject sports competition. Any such approach to defining a plurality of intra-game scoring intervals will be understood to be also within the scope of the intended coverage of the present patent.

Following the conclusion of each intra-game scoring interval, which is then a closed interval, the ticketing server and the ticketing software component will determine any winners and payouts by using the actual scoring statistics for the subject sports competition to identify the occurrence of any wager event within the closed interval which corresponds to an outcome record for the closed interval in the outcome database. If any such wager event has occurred it represents a paying wager.

Following the determination of the existence of any paying wagers with respect to the closed interval, the system will determine the total wager pool, which are the total wager amounts for all pool tickets sold in respect of the closed interval. The house proceeds portion of the total wager pool for the closed interval, being the operator portion of the wager pool to be retained by the house or operator, would be calculated based upon a predetermined formula. The remainder of the total wager pool net of the house proceeds portion are the player proceeds portion, for distribution in respect of any paying wagers. The player proceeds portion will then be allocated amongst paying wagers for tickets sold in respect of the closed interval, based upon the number of tickets sold in respect of each paying wager and the wager amounts of each ticket sold, using a predetermined formula. Many types of predetermined formulas could be used and all will be understood to those skilled in the art of the allocation of sports pool proceeds. If no paying wagers are identified in respect to the pool tickets sold corresponding to the closed interval the player proceeds portion is retained for distribution along with the player proceeds portion in respect of the next chronologically following scoring interval. The ticketing server and the interface to the account funding system will then facilitate electronic payout of any ticket payout amounts for each winning ticket in respect of paying wagers determined in the closed interval, based upon the corresponding ticket records and other information stored within the system and server and connected interfaces.

House liability is minimized by allowing for the collection of the house proceeds portion for each closed interval in the subject sports competition regardless of whether there are any paying wagers, and wherein if there are no paying wagers identified in the last chronological scoring interval in the subject sports competition the total wager pool including any retained player proceeds portion from the chronologically preceding scoring interval are retained as house proceeds by the operator of the pool.

It is specifically contemplated that multiple sold pool tickets could correspond to a particular outcome record—more than one player could place the same wager. This would further maximize the size of the pool and potential house proceeds portions along with player proceeds portions for distribution in respect of individual potential outcomes that purchasers may wish to wager on. For example more than one person might wish to wager on a particular favorite player scoring within an interval or a particular type of a scoring play being achieved at a particular interval in a game by a particular team, and by allowing multiple tickets to be sold in respect of the particular outcome record this type of a multi-purchase approach will be facilitated. As outlined many types of team and player based wager events could be conceived in respect of which wagers might be solicited and all such types of individual or team wager events are contemplated within the scope hereof.

The purchaser interface to the account funding system could be any necessary software and hardware components to facilitate a user interface and the maintenance of user accounts for ticket purchasers as required as well as to capture ticket and wager payments and to refund successful wager proceeds amounts. The purchaser interface might include a user interface which can be served to a client device, or might comprise software components required to integrate the necessary communication with the account funding system to facilitate credit and debit transactions against an account balance of the user for the ticket and proceeds transactions of the method.

In certain embodiments the outcome database will be pre-populated with outcome records for all of the scoring intervals in the subject sports competition before the commencement of the subject sports competition so that purchasers can purchase tickets in respect of more than one scoring interval through the entire subject sports competition in a single purchase transaction before the subject sports competition begins. In other cases the outcome database can be populated with outcome records for individual scoring intervals in the subject sports competition as the subject sports competition progressed, permitting for a more randomized approach to the offering of potential wager events to take place as the subject sports competition develops. This could increase the amount of activity and excitement and layout of the method throughout the subject sports competition.

Rather than permitting the purchase of tickets corresponding to outcome records for multiple scoring intervals in the subject sports competition at the same time, the method might be modified to only permit the opening for purchase of particular outcomes in a forthcoming scoring interval in for example the preceding scoring interval in the subject sports competition, to entice players back to place further wagers by purchasing additional tickets throughout the conduct of the subject sports competition.

Many different types of purchaser interfaces which could be used by the ticketing server in communication with client devices will be obvious to those skilled in the art of software and interface design and all are contemplated within the scope hereof. The ticketing server could for example facilitate the display of a matrix of available outcome records for wagering purposes in respect of which pool tickets can be sold to the human interface of a client device, and that interface could then permit the quick selection and payment for pool tickets in that fashion.

It is specifically contemplated that the client device used within the method of the present invention could be an individual smart device such as a smartphone, tablet, personal computer or the like of the purchaser. In other embodiments the client device could comprise an interactive kiosk or computer display which allowed for the use by multiple purchasers in a group environment, whereby multiple purchasers could purchase pool tickets from the same client device—for example a computer with a larger touchscreen interface—this type of a client device would allow for use of the method in a group environment for example a sports book or casino setting or other permitted location and could again permit increased enjoyment and excitement for players resulting in a higher number of ticket sales.

The ticketing server could be a Web server with the interface being served to various client devices being served as a web interface to a browser, or the ticketing server could also communicate with a locally installed software application on the client devices.

In further embodiments, the system could permit the use of multiple client devices to allow for either a single location local operation of the method of the present invention, or in other cases for a distributed approach. For example multiple players in multiple physical locations where the operation of the method was legislatively permitted could purchase tickets in the conduct of the method resulting in larger pools and payouts. In other operations, the ticketing server could be programmed to permit the conduct of one or more pools in accordance with the method but limiting the amount of locations or number of participants to those at a particular individual location either for the purpose of being the participants down to those in a particular single location for licensure or regulatory purposes.

The method of the present invention could be practiced in respect of any particular type of the team subject sports competition including sports games of hockey, football, baseball or any other two team sport.

The method of the present invention can also be offered either as a standalone method for a single location where the number of subject sports competitions in respect of which the ticketing server could offer pool tickets for sale was one, or in other cases the number of subject sports competitions in respect of which the ticketing server could offer full tickets for sale could be more than one night could be offered in a service bureau method. Both such approaches are understood to be within the scope of the present invention.

In addition to the method of the present invention there is also disclosed a ticketing server for use in the delivery of the method of the present invention. The ticketing server of the present invention, for the conduct of an electronically facilitated event-based sports pool in relation to an independently administered team subject sports competition comprised of two multiplayer teams competing within a plurality of intra-game scoring intervals, comprises hardware as would be known to those skilled in the art including a network connection permitting communication with client devices of pool ticket purchasers. The network connection would be either a local or a wide area network connection capable of communicating with the plurality of client devices of ticket purchasers—the client devices themselves as outlined elsewhere herein might comprise individual mobile devices or smart devices of purchasers, or in other embodiments could also comprise electronic kiosks or interactive screen through which multiple purchasers could participate in a interactive wagering session, buying pool tickets in respect of one or more scoring intervals in the subject sports competition. Any type of a network connection and network communication protocol capable of facilitating the necessary communication with client devices as outlined will be understood to be within the scope of the present invention. In addition to the network connection and the typical processor, memory and other hardware components, the ticketing server of the present invention would also comprise a ticketing software component for administering the method of the present invention and facilitating two-way communication with client devices for the sake of the purchase of pool tickets and the redemption of paying wagers in respect of tickets sold.

The ticketing server would also be operatively connected to or would host:

a. an outcome database comprised of a plurality of outcome records each corresponding to a potential wager event for a team or a player of a team within a scoring interval in the subject sports competition, wherein there is at least one outcome record for each time in each scoring interval of the subject sports competition and there is a wager value assigned to each outcome record; and b. a ticket database comprised of ticket records each corresponding to a pool ticket sold corresponding to an outcome record and wager value, and including purchaser details and payment details corresponding to a payment method by which successful wager amounts can be paid to said purchaser; and c. an account funding system through which wager payments and winning wager amounts can be received, processed and dispersed on behalf of individual purchasers of pool tickets in accordance with the remainder of the method.

The ticketing server of the present invention would facilitate the sale of pool tickets in respect of each scoring interval in the underlying sports subject sports competition to purchasers, up until the time of commencement of that scoring interval. The pool tickets in respect of an interval would be sold by, in respect of each pool tickets sold, communicating with the client device and use a purchaser interface in conjunction with the funding processing system to capture the necessary purchaser details including payment details corresponding to the purchaser through which ticket payment transactions could be transacted against the account or funding source of the purchaser, and redemption amounts for paying wagers could be refunded. The server and the ticketing software component would also through interaction with a human interface display of the client device allow the purchaser to associate their desired purchase with at least one outcome record for the at least one yet to commence scoring interval with their proposed ticket purchase. One or more potential outcomes for one or more scoring intervals yet to commence could be purchased on a single ticket and payment interaction.

The server, through the account funding system, will capture payment for the aggregate wager amount for all of the associated outcome records from the client device of the purchaser—there would be a wager amount associated with each outcome record selected, and the purchaser would effectively deposit as the ticket purchase price the aggregate amount of all of these wager amounts as the ticket purchase which would be processed as outlined. Following the successful completion of the payment transaction, the ticketing software component and the server would store the sold ticket particulars of the soul ticket to a ticket record in the ticket database. Sales of pool tickets in respect of a particular intra-game scoring interval would stop before the commencement of that intra-game scoring interval in the subject sports competition.

The ticketing server in conjunction with the ticketing software component would facilitate the distribution of the wager pool proceeds after the completion of each intra-game scoring interval. A completed intra-game scoring interval is a closed interval. At the conclusion of a scoring interval, the ticketing server using the ticketing server software component will use the actual scoring statistics for the related subject sports competition to identify the occurrence of any wager events having taken place within the closed interval which correspond to an outcome record for the closed interval in the outcome database. If there were any team or player based wager events that took place within the closed interval in the subject sports competition as were predefined in the outcome database, any such wager events having occurred corresponding to a outcome record represent a paying wager.

The total wager pool will be determined for the closed interval. The total wager pool is the aggregate total of the wager amounts for all of the pool tickets sold in respect of the closed interval. The total wager pool will then be distributed as follows. The house proceeds portion of the total wager pool for the closed interval will be determined based upon a predetermined formula, being a predetermined amount of the total wager pool which will be retained by the operator of the pool. The remaining portion of the total wager pool net of the house proceeds portion along with any retained player proceeds portion from the chronologically preceding scoring interval is the player proceeds portion of the total wager pool [there could be a retained player proceeds portion from the chronologically preceding scoring interval if the chronologically preceding scoring interval had no paying wagers, resulting in the player proceeds portion from the chronologically preceding scoring interval being carried forward].

Ticketing server would next determine any payout or distribution of the player proceeds portion as follows. If no paying wagers are identified in respect of the closed interval—i.e. none of the wager events which were predefined as potentially paying wager events in respect of the particular closed interval actually took place in the game—there would be no payout of the player proceeds portion and it would be carried over/retained for distribution in respect of the next chronologically following scoring interval. In a circumstance where any player proceeds portion amounts are being paid out to the purchasers of sold tickets corresponding to the closed interval, the server will through its interface connection to the account funding system facilitate the electronic payment of the determined ticket payout amount for each winning ticket sold to the purchaser of the ticket using stored payment details. It is specifically contemplated that in the primary embodiments of the method of the present invention the distribution of winnings from the aggregated pool proceeds to individual players having purchased winning tickets would take place following the conclusion of each closed interval although it is also possible that the distribution of winnings from the aggregated pool proceeds could take place in an aggregated fashion once at the end of the subject sports competition.

If there are no paying wagers identified in the last chronological scoring interval, or there are paying wagers identified in respect of which there were no tickets sold corresponding to the last chronological scoring interval in the subject sports competition, the total retained wager pool including any retained player proceeds portion from the last chronological scoring interval and any chronologically preceding scoring intervals would be defaulted to the operator of the pool.

As outlined above, the ticketing server and its related ticketing server software component will serve or facilitate the display of a matrix of available outcome records in respect of which pool tickets can be sold to the human interface of client devices operatively connected thereto, facilitating the sale of pool tickets related to individual yet to commence scoring intervals within the subject sports competition. The ticketing server could be a Web server and the sale interface for tickets could be served to the client device browser, or in other embodiments, the ticketing server could interact with a locally installed application on the mobile device of purchasers to facilitate the sale of tickets. The account funding system could be a pre-existing account management system for customers of a traditional electronic architecture sports book, whereby a purchaser who wished to play the game of the present invention could participate using a systemwide user credential or account on the account funding system which was capable of permitting the funding and receipt of disbursement of payments and wager proceeds. In other embodiments, the account funding system could be a integral or single-purpose payment processing gateway and the like directly integrated within or connected to the server.

It is specifically contemplated that the ticketing server could interact with varying types of client devices for the purpose of the sale of pool tickets. The client devices could be individual mobile devices of customers such as tablets, smart phones and the like, or in other larger scale embodiments of the method of the present invention, even those for distributed activity between multiple wagering locations, the client device capable of facilitating ticket sales and wager proceeds refunds or payouts could be larger scale electronic kiosks permitting multiple players to interact with the server for the purchase of tickets at the same time. Subject sports competitions in respect of which the method of the present invention could be administered would be any to team sporting competition having multiple individual players on teams. This includes the sports, for example, football, hockey, baseball, basketball etc.

The ticketing server could be configured to permit the administration of sports pools in accordance with the method in respect of a single subject sports competition at one time, or in other embodiments could conduct multiple pools in respect of multiple subject sports competitions in parallel, in more of a service bureau approach. Both such approaches are contemplated within the scope of the present invention.

In some embodiments of the method of the present invention any carried forward player proceeds amount from preceding chronological intervals in a competition in respect of which there were no paying wagers could be included in the calculation of the total proceeds amount for the next following interval either before or after the determination, calculation and reservation of the house proceeds portion.

The ticketing server of the present invention could be any server capable of facilitating any embodiment of the method outlined and claimed herein. In addition to the ticketing server and the method, the ticketing software component used on the server to execute the steps of the method is a further embodiment of the present invention which is understood to be contemplated within the scope hereof.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labelled with like numerals, and where:

FIG. 1 shows one embodiment of a matrix of possible wager events defined in respect of a football game, for the purpose of demonstrating the team-based and player-based wager events concept;

FIG. 7 is a non-limiting, exemplary table representing the type of information retained within an outcome database according to an embodiment; and FIG. 8 illustrates non-limiting, exemplary ticket records corresponding to four example pool tickets according to an embodiment.

DETAILED DESCRIPTION OF ILLUSTRATED EMBODIMENTS

Figure 2:
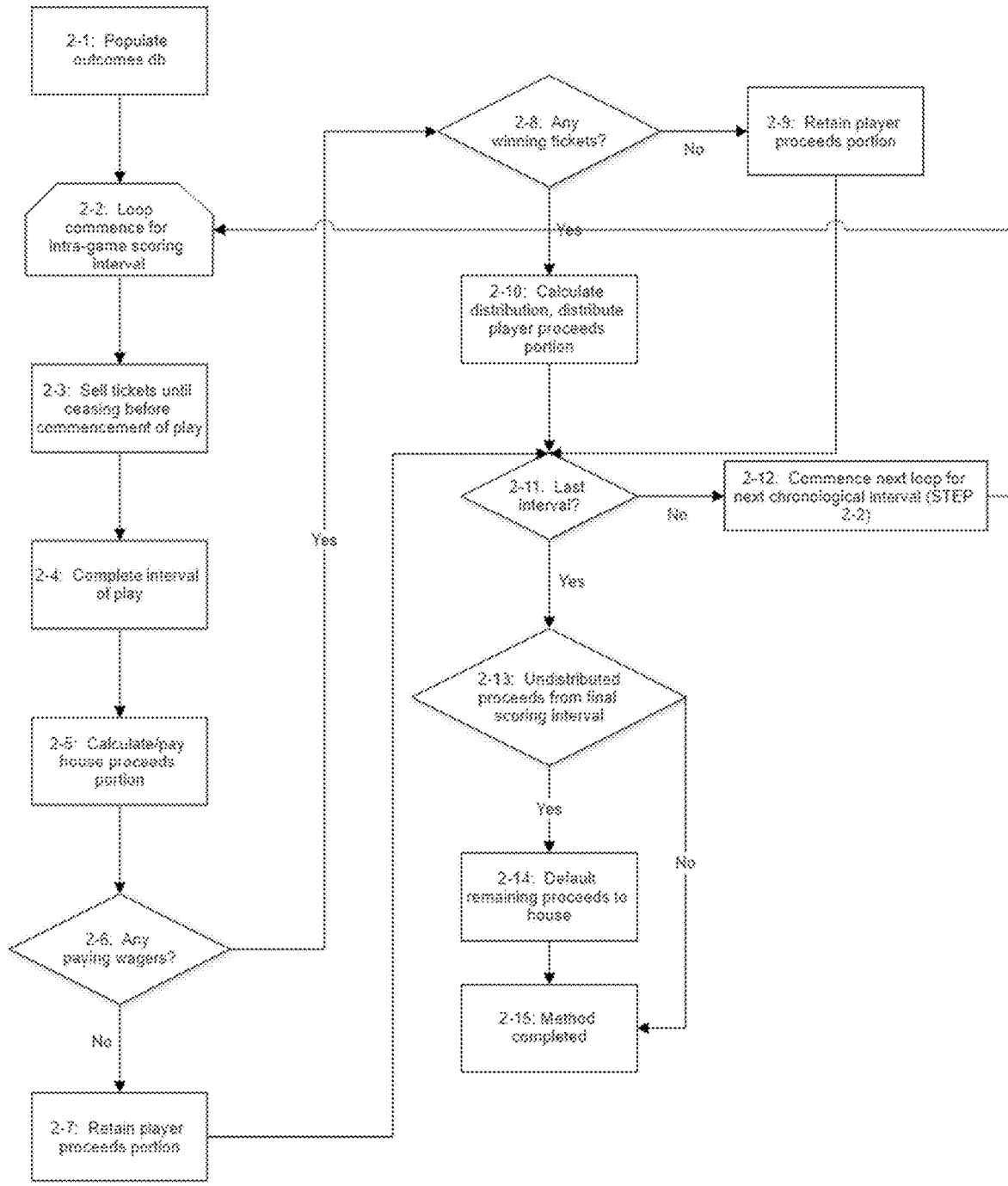
FIG. 2 is a flowchart demonstrating the basic steps in one embodiment of the method of the present invention.

The invention comprises a novel method of electronically facilitating a sports pool in respect of a sporting competition having a plurality of intra-game scoring intervals therein. With the advent of the internet, online and electronic lotteries allow mass participation from lottery ticket purchasers. Effectively the method of the present invention results in the administration of a plurality of intra-game sports pools conducted in respect of individual scoring intervals within the subject sports competition in respect of which the pool is conducted. For example in a football game having four quarters each of which corresponds to an intra-game scoring interval, the method of the present invention effectively comprises the conduct of four individual saleable sports pools in respect of an individual sporting match, versus a single individual saleable sports pool in respect of the final score thereof. The method will permit for higher volume and higher velocity sales and facilitation of wagering in a sports pool related to a sporting competition having two teams with multiple players therein, the electronic fulfilment of which addresses shortcomings in prior art paper-based methods and will allow for wider adoption and commercial success.

To fully appreciate the functionality of the present invention it is beneficial to establish certain terminology used in the remainder of the specification to describe the invention.

The types of sports competitions or games in respect of which the method of the present invention could be conducted would be any type a sporting competition with two teams comprised each of multiple players, working together to achieve various types of point scoring or outcomes resulting in a quantitatively based score or win for one team are contemplated within the scope of the present invention. For example, the sports of hockey, football, baseball, basketball or the like are explicitly contemplated within the scope of the present invention. Any type of a sport that has games or competitions comprised of two teams each having a plurality of players thereon contributing to scoring opportunities or efforts to win the game are all contemplated within the scope of the present invention.

Intra-Game Scoring Intervals:

There could be any number of scoring intervals within the subject sports competition. The scoring intervals are arranged in chronological order within the competition, concluding with the last scoring interval which is important for the purpose of determining the distribution or retention by the house of any retained proceeds from preceding scoring intervals. The scoring intervals themselves could be a predefined period of time within the subject sports competition, or could correspond to intra-game scoring intervals or periods of time as might be defined in the rules of the game—for example in a hockey game there are three 20-minute periods or in a football game there are four 15-minute quarters, and the scoring intervals could correspond to the periods, quarters, or any other type of predefined scoring interval.

The scoring intervals can also be defined in respect of the subject sports competition specifically in respect to the method—for example the operator of the method could prescribe a period of time comprising the scoring intervals within a particular subject sports competition. Any such approach to defining a plurality of intra-game scoring intervals will be understood to be also within the scope of the intended coverage of the present patent.

Wager Events:

Wager events in respect of the subject sporting competition of the method of the present invention include team-based and player-based scoring and outcomes. This is a broader category of potential wagering outcomes than those of prior art sports pool methods which relied solely upon interim or final scores for one or the other team in a sports pool method. In the method of the present invention, it is explicitly contemplated that the team-based scoring and outcomes that would represent wager events with respect to individual intra-game scoring intervals in the method of the present invention would include the occurrence of various types of scoring plays within those individual intra-game scoring intervals. Team-based wager events could comprise not only the scoring in a particular interval in the competition but also the type of scoring play—for example related to a football game if the team scored a field goal within a particular scoring interval, the fact that the scoring play was a field goal versus a touchdown might be a wager event in respect of which certain players of the pool method wished to place wagers or purchase tickets.

Player-based wager events in the subject sports competition could include an individual player on an individual team participating in a scoring play, scoring a particular type of play or accomplishing some other statistical occurrence within a particular scoring interval of the underlying subject sports competition. It is specifically contemplated that the method of the present invention would facilitate wagering based on both team-based and player-based wager events in respect of individual intra-game scoring intervals in the subject sports competition.

FIG. 1 shows a sample of a series of wager events defined in respect of a football game, for the purpose of demonstrating the team-based and player-based wager events concept. In that case, the player-based wager events can be seen as a plurality of players who might score or participate in a scoring play. The plurality of players have different wager amounts associated with them in this particular embodiment. There are also team-based wager events included in that matrix including special-teams points for the scoring of a field goal. The provision of the ability for player-based wager events to be incorporated into a team-based pool wagering method permits and ability for individual ticket purchasers or wagering participants to place wagers in respect of their favourite player on the team, versus just wagering on team-based outcomes. As well, the ability to place wagers in respect of team-based wager events such as scoring of a particular type of point or opportunity, versus simply relating a pool to interim or final scores in the game provide a more exciting and more complex wagering matrix which will again lead itself to a higher level of excitement and player involvement.

Given the two team pool nature of the method of the present invention it is specifically contemplated that the number and type of wager events available for ticket purchase in respect of each team for each scoring interval in the game might be the same number i.e. the same number and type of team-based and player-based wager events could be available in the outcome database for each of the two teams for each scoring interval. It will be understood however that in certain other embodiments of the method of the present invention there may be an asymmetrical number of wager events available in respect of each of the two teams which are the subject of the subject sports competition. Both such approaches are contemplated within the scope of the present invention. The same potential wager events could be used for a team or player of a team within multiple scoring intervals in the subject sports competition, or in other embodiments the potential wager events could be changed between scoring intervals.

The method of the present invention would permit wagering on both team-based wager events and player-based wager events within each scoring interval in the subject sports competition, whereby there would be at least one team-based wager event and at least one player-based wager event available with respect to each scoring interval in the competition for wagering purposes. It is specifically contemplated that the ability to on a interval by interval basis within the game place wagers related to the in game conduct of individual players in addition to the in game outcomes for the two teams engaged in the subject sports competition is a significant enhancement over the current state-of-the-art in such wagering methods. The overarching method of the present invention is also intended to be played in more of a real-time embodiment even throughout the conduct of the subject sports competition as individual intra-game scoring intervals arrive and elapse, which should again maximize the level of excitement and wagering activity. Also, unlike many prior art methods of sports-based wagering where ticket purchases relate to randomized selections of interim or final team-based scores or the like, the present method would not require the sale of all of a particular matrix of outcomes in order for the pool to proceed in conjunction with the subject sports competition. House liability is decreased in this regard in so far as the completion or operation of the pool in a traditional context where all of the assigned or available tickets were not sold does not result in increased administrative cost of operation of the pool for the operator since it is unnecessary to cover the cost or pool contribution of unsold tickets etc.

Wager Amounts:

Each wager event with respect to the subject sports competition or any individual scoring interval therein would have a wager amount associated with it. The wager amount would effectively be the purchase price of a pool ticket in respect of a wager being placed on that particular wager event by purchaser/player. The wager amount could be the same amount of money for each potential wager event [for example the system and method might be configured such that the wager amount for any wager event was for example $5], or individual wager events and their configuration of the system could have different wager amounts associated therewith [team-based wager events could have a higher wager amount associated with them than a player-based wager event, vice versa or otherwise]. Both such approaches are contemplated within the scope of the present invention.

In further embodiments of the present invention it is specifically contemplated that the software and the method could permit a player to actually establish their own selected wager amount in respect of a wager event when a ticket in respect of a scoring interval was being purchased. Adjustable wager amounts such as this would need to be reflected in the predetermined formulae for determination of house proceeds portions and distribution of player proceeds for paying wagers but this will be understood to those skilled in the art of wagering systems and the design of games of chance and will be understood to also be contemplated within the scope of the present invention.

Wager Pool and Proceeds Amounts and Distribution:

In gaming methods, it is standard for the operator of the gaming method, often referred to as the "house", to receive a portion of the proceeds of a wager pool as a cost of operation of the method. Various formulas can be used to calculate the house proceeds portion although in the method of the present invention it is primarily contemplated the house proceeds portion might be determined by a predetermined formula with something as simple as a particular percentage of the total pool proceeds being allocated as the house proceeds portion. Any type of a formula for the purpose of determining house proceeds which is based either as a basic percentage or in something more complicated based on ticket sales volumes, wager amounts and distributions etc. are all contemplated within the scope of the present invention.

The total proceeds for wager amounts related to tickets sold pertaining to a particular scoring interval, less the house proceeds portion, is the amount of proceeds that will be distributed to any winning ticket purchasers related to paying wagers identified in the closing interval. There could again be many different types of formulae used to distribute these proceeds, including using number and type of ticket sales, wager amounts, number of available wager events for each team and the like as variables in the determination of the distribution of proceeds to any holders of tickets related to paying wagers identified in respect of a particular scoring interval in the subject sports competition. Any type of a formula achieving this objective, regardless of the variables used, is intended to be within the scope of the present invention.

Where different wager amounts are assigned to different types of wager events, the related proceeds distribution formulas can also be modified or weighted differently in terms of potential payouts on ticket sales where paying wagers are determined to exist within a particular scoring interval. The necessary modifications to the distribution formulae to accommodate varying wager amounts in respect of different types of wager events as recorded within the outcomes database of the method of the present invention will all be understood to those skilled in the art of system design of this nature and are contemplated within the scope of the present invention.

Figure 3:
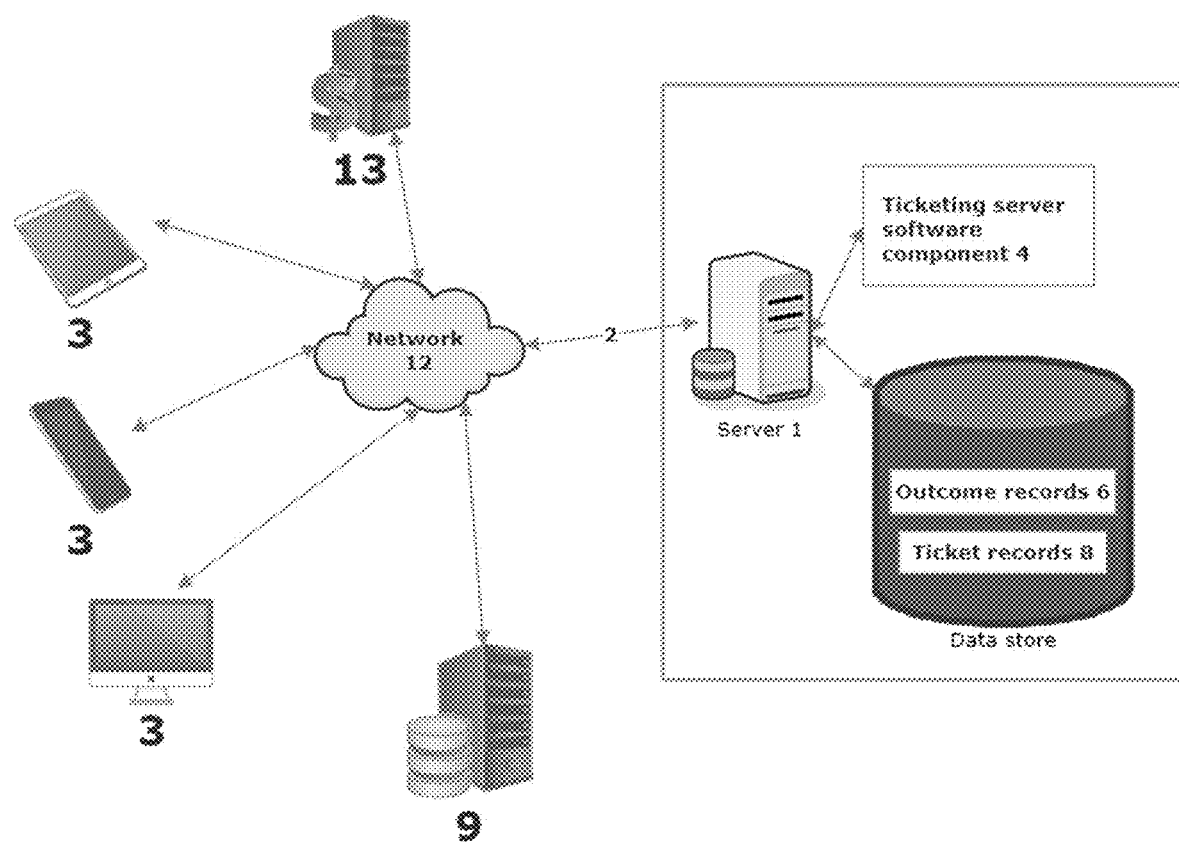
FIG. 3 is a block diagram of one embodiment of a system architecture in accordance with the present invention, in which the lottery sales terminal comprises a plurality of lottery sales terminals.

Method Overview:

FIG. 3 is a sample architectural drawing showing the components of one embodiment of a system in accordance with the electronic gaming method of the present invention. The ticketing server 1, which would be a typical computer server capable of facilitating software-based method such as that outlined, would include a network connection 2 which would permit communication of the ticketing server 1 with client devices 3 of pool ticket purchasers. As will be outlined in further detail below, the client devices 3 of pool ticket purchasers could be individual mobile or individual computing devices of purchasers which could be used to interact with the server 1 to purchase tickets and participate in the method, or in other embodiments, the client device 3 which could be used to interact with the server 1 could be a large-format electronic kiosk with a screen of sufficient size to permit a more complicated user interface allowing multiple players or purchasers to interact with that kiosks 3 at the same time and purchase tickets. The varying types of client devices 3 outlined elsewhere herein are all contemplated to be within the scope of the invention and could all have necessary modifications made to the software interface to be served by the server 1 to the devices 3 for the purpose of facilitating the method.

In addition to the network interface 2, the server would also comprise a ticketing software component 4 which would be the necessary processor instructions to allow the server 1 to facilitate and administer the method of the present invention, communicate with client devices 3 and sell tickets, administer the method, distribute proceeds etc. Any ticketing software component 4 comprising a series of processor instructions for storage or execution upon a processor and related hardware and software of a server 1, which will result in the facilitation of the method as claimed that outlined herein, is contemplated within the scope of the present invention.

The server 1 would include, in addition to the normal processor, clock, memory and other electronic components, either in locally hosted storage or by way of a network connection to datasets which would be required for the administration of the method hereof. The processor would connect to an outcome database 5 comprised of a plurality of outcome records 6 each of which correspond to a potential wager event for a team or a player of a team within a scoring interval in the competition. There would be at least one outcome record 6 for each scoring interval of the competition and there would be a wager value assigned to each outcome record, and the outcome database would include at least one outcome record 6 for each scoring interval in the competition.

In addition to the outcome data set 5, the server 1 would also be operatively connected to a ticket database 7 comprised of a plurality of ticket records 8 each of which corresponds to a sold ticket. Each ticket record 8 would correspond to at least one outcome record 6 and would include purchaser details which could be used in conjunction with the account funding system to pay out successful wager amounts to the purchaser of the ticket.

The server 1 also includes, as shown, an external interface to an account funding system 13. The account funding system 13 might also be an internal component or subsystem of the server 1 and the related ticketing server software components 4. In any event, the account funding system 13 will be the identity and payment processing system by which payments for purchased tickets can be processed and successful wager amounts can be refunded or dispersed to ticket purchasers. In embodiments of the method of the present invention offered within the environment of a pre-existing electronic architecture sports book environment, there may already be a user credential and account management system in place which is used by players to play across multiple games and platforms and could simply be attached and integrated to the method of the present invention. Freestanding or integrated single-purpose payment processing and security or credentialing platforms will also be understood to be within the scope of the present invention. The account funding system 13 is also shown in this embodiment to be connected to the server 1 by the wide area network 12 used to connect client devices 3. A separate network connection of the account funding system 13 to the server 1, or a locally connected system or components will also be understood to be within the scope of the present invention.

The server 1 would also include a results interface 9 through which intra-game scoring results corresponding to wager events can be captured related to the subject sports competition for the purpose of completing the closure of a scoring interval and the allocation of wager pool proceeds. That interface could be a human interface through a display or else where to the server 1, through which an operator could manually enter the wager events outcomes in the particular closed scoring interval to the system, or in other embodiments of the system of the present invention the interface through which intra-game scoring results corresponding to wager events could be captured could be an interface to an electronic system that was otherwise available and which contained the necessary statistics or information related to the subject sporting competition to allow for the capture of wager events in a closed interval without the need for a manual human input. Both such approaches are contemplated within the scope of the present invention. In the embodiment of this Figure, the results interface 9 is another externally connected server which could be any one of a number of different types of servers or data provider services capable of providing real-time sports statistics updates to the system and method of the present invention.

Population of the outcome database 5 is shown at step 2-1. Population of the outcome database 5 would typically be performed by the operator of the pool method in advance of the opening for sale of the pool. The detail to be stored within the outcome records 6 will be understood to those skilled in the art of database design—basically the necessary information to compare the outcome record 6 to the outcomes of the corresponding scoring interval available via the game statistics interface 9—any type of a data structure that stores this type of information in the outcome records 6 is within the scope of the present invention. As outlined in detail elsewhere throughout this document there will be a plurality of outcome records 6 in respect of each intra-game scoring interval, with at least one outcome record 6 corresponding to a team related wager event and at least one outcome record 6 corresponding to a player-related wager event.

The method comprises selling pool tickets in respect of each scoring interval in the competition to purchasers up until the commencement of the scoring interval in the competition. The method shown in FIG. 2 demonstrates a loop commencing at step 2-2, for each intra-game scoring interval in chronological order. Tickets could be sold before the game starts altogether, or at any time up to the beginning of a scoring interval in respect of wager events in that interval. The sale of tickets until the cessation of sales before the commencement of play in the interval is shown at step 2-3. The sale of pool tickets in respect of a scoring interval to purchasers comprises using the ticketing server 1 and the software component 4 in communication with one or more client devices 3 to capture necessary purchaser details in respect of a purchaser who wishes to purchase a pool ticket, along with capturing an association of the purchaser and the ticket being sold with at least one outcome record 6 in the outcome database 5. As is outlined throughout, a purchaser could purchase a ticket which included wagers on more than one wager event by associating their purchased ticket with more than one outcome record 6 in respect of a scoring interval.

The sold ticket particulars captured from the purchaser by interaction with a client device 3 at the server 1 would include capturing payment method details by a purchaser interface to the account funding system 13. The account funding system could be as simple as being a credit card payment gateway, where credit card payment details were captured and stored in respect of each ticket transaction and ticket record, or as is outlined elsewhere. It is explicitly contemplated that the account funding system 13 in the context of the previously established electronic architecture sports book operation could comprise the pre-existing credentialing or account management system of the operator, through which players are permitted to stake different wagers and receive wager payout amounts in respect of multiple different games or bets placed within the architecture of the provider. Both such approaches are contemplated within the scope of the present invention. In other cases, payments could be facilitated and refunds received via an electronic wallet application with the client device 3 of the purchaser. The specifics of the handling of electronic payment transactions of this nature are understood to those skilled in the art and any type of a system architecture and an account funding system 13 design or integration which allowed the ticketing server 1 and its related software components 4 to process payment transactions with information captured in accordance with the remainder of the method of the present invention are contemplated within the scope hereof.

Following the completion of a purchase transaction in respect of the pool tickets sold, using the account funding system 13, the software component 4 would create a ticket record 8 in the ticket database 7 corresponding to the tickets sold which would be associated with each outcome record 6 selected and sold with the ticket to the purchaser.

Ticket sales in respect of a particular intra-game scoring interval would stop before the play of that interval in the actual competition begins. Once the intra-game scoring interval begins, and runs its course to its conclusion, the completion of the interval of play is shown at step 2-4. A completed intra-game scoring interval is a closed interval.

Once the interval becomes a closed interval, the server 1 executing the ticketing software component 4 will calculate the necessary proceeds distribution and the like for the closed interval. The calculation and distribution of proceeds at the close of each interval comprises an interval closing step. The interval closing step would consist firstly of calculating the total wager pool for the closed interval, comprising the total wager amounts for all pool tickets sold in respect of the closed interval. Aggregation of this total wager pool would be reliant upon information stored in the ticket database 7 and the outcome database 5 and will be understood to those skilled in the art such that any type of a formula or database query resulting in the determination of the total wager pool value is contemplated within the scope of the present invention.

A house proceeds portion of the total wager pool would then be determined for the closed interval based upon a predetermined formula. The house proceeds portion is retained by the operator of the pool and is effectively the administrative fee charged by the operator of the pool. Various predetermined formulae could be used—everything from a simple percentage of the total wager pool to a more elaborate calculation. Any type of a formula resulting in the calculation of a house proceeds portion of the total wager pool will be understood to be within the scope hereof. Calculation and payment of the house proceeds portion of a particular wagering pool in respect of a closed interval is shown at step 2-5. The house proceeds portion will be calculated and paid regardless of the existence of any winning wagers having been sold in respect of a particular interval.

The available player proceeds portion for the closed interval will then be calculated. The available player proceeds portion would comprise the remainder of the total wager pool net of the house proceeds portion, plus any retained player proceeds portion from the chronologically preceding scoring intervals for preceding intervals in which there were no paying wagers. The available player proceeds portion can then be distributed to any winning ticket holders for the closed interval as follows.

The server 1 and the ticketing software component 4, using the actual scoring statistics for the competition, obtained by the results interface 9 to identify the occurrence of any wager event having occurred within the closed interval which corresponds to an outcome record for that closed interval. Any such wager event which has occurred in the closed interval represents a paying wager. The determination of the existence of any paying wagers in the closed interval, within the interval closing step, is shown at step 2-6. If no paying wagers exist with respect to the closed interval, the available player proceeds portion is retained for inclusion in the available player proceeds portion for the chronologically following scoring interval in the competition, or if the closed interval is the last scoring interval in the competition the entire available player proceeds portion is defaulted to the house. Retention of the player proceeds portion where no paying wagers exist are shown at step 2-7.

If at least one paying wager is identified with respect to outcome records 6 in the outcome database 5 for the closed interval, the next step conducted by the ticketing software component 4 will be to identify whether or not there are any ticket records 8 associated with the outcome records 6 for the paying wagers, representing winning tickets in respect of which a payout would take place. If there are no sold pool tickets in respect of any identified paying wagers, again the player proceeds portion is retained for distribution of the next chronologically following scoring interval or if the closed interval is the last scoring interval in the competition the entire available player proceeds portion is defaulted to the house. Determination of the existence of any winning tickets having been sold as recorded in ticket records 8 in the ticket database 7 is shown at step 2-8. The retention of the player proceeds portion where there are no winning tickets having been sold is shown at 2-9.

If there are sold pool tickets in relation to the closed interval in respect of at least one paying wager, the available player proceeds portion will be allocated to each sold pool ticket corresponding to a paying wager using a predetermined formula based upon the number of winning tickets sold and the wager amount of each winning ticket sold, each allocated amount of the available player proceeds portion being a ticket payout amount. Calculation of the distribution of the available player proceeds portion to winning ticket holders is shown at step 2-10. Once the distribution of the available player proceeds portion to winning ticket holders has been calculated by the ticketing software component 4, the server 1 and the ticketing software component 4 will facilitate the distribution of the available player proceeds portion back to the payment methods of the individual purchasers of the winning tickets, via the account funding system 13 and using any necessary purchaser identification information included in individual ticket records.

At the conclusion of the interval closing step, represented by the distribution of the available player proceeds portion of the total wager pool in respect of any winning tickets, the Figure shows a logic test at the end of the loop to determine whether or not the closed interval in respect of which the interval closing step has been conducted is the last intra-game scoring interval for the competition (2-11). If the closed interval was not the last intra-game scoring interval, the negative leg of that decision block through step 2-12 shows the loopback for the conduct of the method in respect of the chronologically following scoring interval.

If it is determined that the closed interval in respect of which a interval closing step has been conducted is the last scoring interval in the competition, if there are any undistributed available player proceeds from the final scoring interval in a case where there either were no paying wagers or no winning tickets sold in respect of the closed interval, the undistributed proceeds are defaulted and paid to the house, shown at steps 2-13 and 2-14 and the method is completed.

As outlined it is specifically contemplated that more than one pool ticket could be sold in respect of an individual outcome record 6 i.e. more than one purchaser could place the same wager with respect to a particular wager event in a particular scoring interval. The wager events in respect of which outcome records could be created could either be team based wager events were player based wager events, both of which are contemplated for use within the method to maximize the different number and types of wagering opportunities which could maximize the size of the pool as well as the operator take in respect of the operation of the method.

In some implementations, the method of FIG. 2 may be accomplished with one or more additional operations not described, and/or without one or more of the operations discussed. Additionally, the order in which the operations of the method are illustrated in FIG. 2 and described below is not intended to be limiting. The method of the present invention would be administered in accordance with any local legislation and gaming requirements, including the integrity of the computer system used to deliver the method, the integrity and independence of the subject sporting competition from the operation of the gaming method etc.

Figure 4:
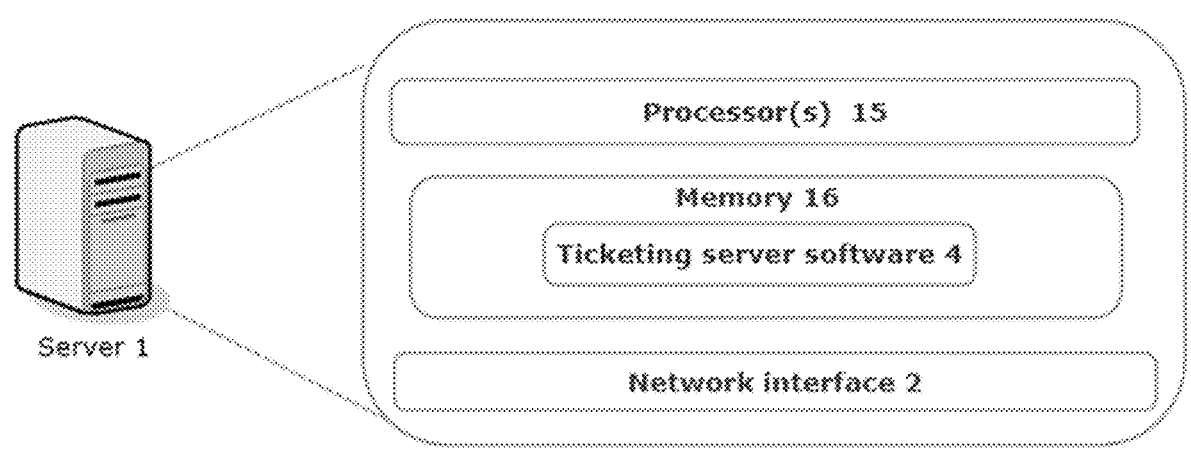
FIG. 4 is a schematic drawing of one embodiment of a ticketing server in accordance with the present invention.

Ticketing Server Architecture:

The method of the present invention and the overall architecture would be client/server in nature and would rely on a ticketing server 1 configured for use in the processing of sales of pool tickets in accordance with the method and the distribution of wager proceeds in respect of any winning tickets for paying wagers sold. The ticketing server 1, a sample embodiment of which is shown in FIG. 4, might consist of one or more ticketing servers 1—a single ticketing server or a ticketing server farm approach. The ticketing server 1 would comprise one or more processors 15 and memory 16. The memory 16 might contain various software components or a series of processor instructions for use in the method of the present invention or otherwise in the operation of the ticketing server 1. Processor instructions corresponding to the payment processing software component are shown stored within the memory 16 in this Figure.

Memory 16 may comprise non-transitory storage media that electronically stores information. The electronic storage media of memory 16 may include one or both of system storage that is provided integrally (i.e., substantially non-removable) with ticketing server(s) 1 and/or removable storage that is removably connectable to ticketing server(s) 1 via, for example, a port (e.g., a USB port, a firewire port, etc.) or a drive (e.g., a disc drive, etc.). Memory 6 may include one or more of optically readable storage media (e.g., optical discs, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Memory 6 may include one or more virtual storage resources (e.g., cloud storage, a virtual private network, and/or other virtual storage resources). Memory 16 may store software algorithms, information determined by processor(s) 15, information received from ticketing server(s) 1, information received from client devices 3, and/or other information that enables ticketing server(s) 1 to function as described herein.

Processor(s) 15 may be configured to provide information processing capabilities in ticketing server(s) 1. As such, processor(s) 15 may include one or more of a digital processor, an analogue processor, a digital circuit designed to process information, an analogue circuit designed to process information, a state machine, and/or other mechanisms for electronically processing information. In some implementations, processor(s) 15 may include a plurality of processing units. These processing units may be physically located within the same device, or processor(s) 15 may represent processing functionality of a plurality of devices operating in coordination.

In many embodiments, the ticketing server 1 is contemplated to be a Web server, where client devices 3 would use a web browser for interaction therewith. Where a local app was developed, ticketing server 1 might not be a Web server per se but might be a ticketing server 1 capable of interaction with the type of an interface on remote client devices. Either such approach is contemplated within the scope hereof.

Ticketing server 1 also requires integration or connection of an account funding system 13, to facilitate the remainder of the method. Some embodiments of the method of the present invention might comprise the incorporation of the necessary additional hardware and software components within ticketing server 1 and its associated hardware and software to allow the ticketing server 1 itself to act as the account funding system 13 to process payment transactions directly in respect of method transactions being executed in accordance with the remainder of the method, to the payment methods or credit cards and the like of customers, and crediting the amounts recovered back. Where in certain cases the account funding system 13 software and hardware would be operated as a component of the ticketing server 1, in other cases, the ticketing server 1 might be connected via its at least one network interface to externally provided account funding system 13 and both such approaches are contemplated within the scope of the present invention.

Ticketing Software Component:

It will be understood that any ticketing software component 4 which has the effect of being able to administer the method of the present invention as otherwise outlined herein when executed on the server 1 is all contemplated within the scope of the present invention. Functions of the ticketing software component 4 would include the creation, administration and maintenance of outcome records 6 within the outcome database 5 as well as ticket records 8 within the ticket database 7, along with interaction of client devices 3 for the purpose of facilitating the purchase/sale of pool tickets and the distribution of pool proceeds as appropriate. The server software component 4 would also be capable of reading from any statistical interface 9 from which details of wager events having occurred within a particular scoring interval of the subject scoring competition was available, as well as facilitating communication with the account funding system 13 for the purpose of the charging and collection of wager amounts in respect of tickets sold as well as the distribution of winning proceeds. The ticketing software component 4 could also encompass any additional required query or reporting functions.

Database Design:

There are two required data structures to facilitate the practice of the method of the present invention in operable connection to the ticketing server 1. These are an outcome database 5 and a ticket database 7. In the architecture shown, there is shown a data store operatively connected to the remainder of the ticketing server 1 which contains the various required data for the operation of the method of the present invention. The data store might be resident on the ticketing server 1, or might be located and administered remotely and operatively connected with the ticketing server 1 via a network or other communications bus.

The outcome database 5 would include an outcome record 6 in respect of each wager event corresponding to a particular scoring interval in a subject sports competition in respect of which it was desired to permit the purchase of pool tickets. As outlined further above, each wager event which it was desired to permit wagering in respect of would either be a team based wager event or a player based wager event—representing a particular type of a scoring outcome or play achievement in the scoring interval with which it was associated, either by the team as a whole or by a player on the team. Insofar as the subject sporting competitions would each be to team competitions with each having a plurality of players, this would allow for heightened intensity of wagering between fans of one team against another and by incorporating the ability to purchase tickets in respect of player based wager events would permit participants in the gaming method of the present invention to place wagers in respect of the outcomes or activities of their favourite players etc.

By assigning the outcome record 6 to a particular scoring interval in a particular sports competition, the chronological window within which it will be possible to purchase pool tickets in respect of the wager event underlying the outcome record 6 will be determined, since tickets can no longer be sold in respect of a particular wager event or a particular scoring interval outcome once the scoring interval has commenced play.

Figure 5:
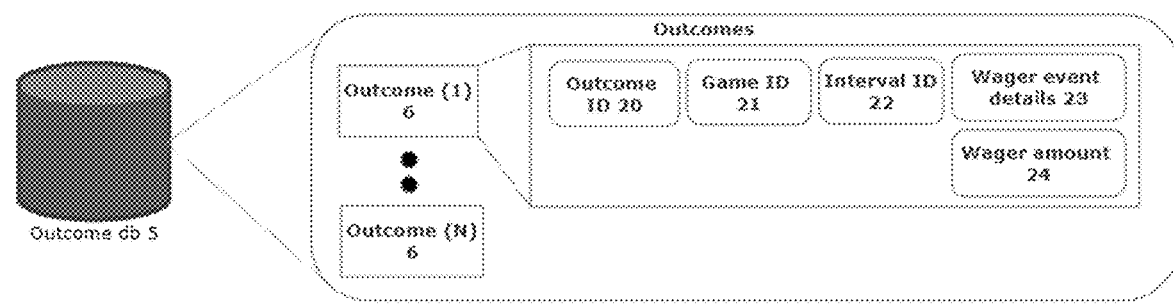
FIG. 5 is a schematic diagram of one embodiment of the data structure of an outcome database in accordance with the present invention.

FIG. 5 is a schematic drawing of a sample of a data structure of one embodiment of an outcome database 5 in accordance with the present invention the outcome database 5 is comprised of a plurality of outcome records 6. As outlined above and will be understood to those skilled in the art various data structures and formats for a data set representing the necessary wager event information to comprise the plurality of outcome records 6 will all be understood to those skilled in the art of database design and are all contemplated within the scope of the present invention. In this Figure, the plurality of outcome records 6 are shown, each of which is demonstrated to comprise a number of relational keys or other information required in a typical relational database format to facilitate database transactions such as those required in the method of the present invention. There is shown an outcome ID 20 which would effectively be a serial identifier for the record 6. Most data structures include a unique record identifier 20 such as this for each record in a table, or in some data formats, another field in the record is used as the outcome identifier 20 and both such approaches are contemplated herein.

In the embodiment of the outcome database 5 shown in this Figure, the data structure is intended to demonstrate the utility of the method of the present invention in an embodiment of the method used to administer the gaming method of the present invention in respect of multiple sporting competitions. A game ID 21 is shown, which could lead to another table holding other game related information for display, data selection and the like. It will be understood that in other embodiments of the method of the present invention where the data structure of the outcome database 5 was intended to perform against only a single sports competition at a time, the game ID 21 might not be hired but both such approaches are again contemplated within the scope of the present invention. In addition to the game ID 21, the demonstrative record structure shown includes an interval ID 22. This would be an indicator of the intra-game scoring interval in respect of which a particular outcome was to be made available for wagering purposes in accordance with the remainder of the method. For example in a hockey game, the interval ID 22 might be the period number of the game if the periods of the game were going to be the defined scoring intervals for the purpose of administering the remainder of the wagering method.

Finally, shown at 23 are the wager event details corresponding to the wager event in respect of which that particular outcome record 6 would be offered for wagering. The wager event details 23 could stipulate in the case of a team-based wager event the team in the competition along with the type of a scoring play, statistical occurrence or otherwise which was intended to constitute a paying wager if it were to occur within the assigned interval in the game. In the case of the player-based wager event, the wager event details 23 could include player details by number, or other identification on a particular team again along with the type of a scoring play, statistical occurrence or otherwise which was intended to constitute a player-based paying wager if it were to occur within the assigned interval in the game.

Also shown is a wager amount field 24 corresponding to the wager amount if a player wishes to purchase a ticket in respect of a particular wager event in an assigned interval and game. As outlined elsewhere, the wager amount 24 could vary depending upon the type of wager event or other wager event details 23. Effectively the wager amount 24 would comprise the ticket price for the purchase of a ticket in the pool method of the present invention corresponding to a particular desired outcome record 6. The wager amount could be the same for each outcome record in the database or could vary. The wager amounts would likely be preset in respect of each outcome record at the time of its creation although there could also be embodiments of the method of the present invention which would permit the purchaser to select their own wager amount with respect to a particular outcome and both such approaches are contemplated within the scope of the present invention.

It will be understood that other fields could be included in a record or a database of this type, for the purpose of enriching the user interface for the sale or redemption of tickets or to add functionality to the method. The outcome records 6 for example in cases where the proceeds distribution formulae were going to be odds based or based on something other than the wager amount 24 could also be included. Addition of such added data tracking in respect to particular wager events, competitions and the like for the purpose of enhancing the administration of the method of the present invention are all contemplated within the scope hereof.

Additional information corresponding to the assigned scoring interval, competition or wager event could also be included—player numbers, player names etc. for player based wager events, or other specific field values or data-types with respect to particular types of wager events which it was desired to stipulate for the purpose of streamlined correspondence of the outcome records 6 with the outcomes of sporting competitions in their scoring intervals to allow for a streamlined interval closing process. It may be necessary to provide or save in respect of each outcome record 6 necessary additional database keys or information to properly match or correspond lookups in respect of a particular wager event.

Figure 6:
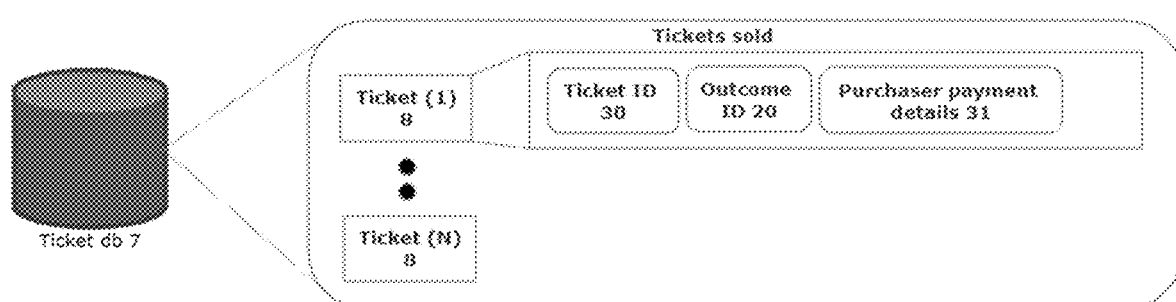
FIG. 6 is a schematic diagram of one embodiment of the data structure of the ticket database in accordance with the present invention.

Turning to FIG. 6 there is shown a demonstrative data structure of an embodiment of a ticket database 7 in accordance with the present invention. The ticket database 7 consists of a plurality of ticket records 8 in respect of each ticket sold in accordance with the method of the present invention. A very basic embodiment of the ticket records 8 is shown for the purpose of demonstrating one relational database approach to the administration of the method of the present invention. Each ticket record 8 would include a serial identifier such as the ticket identifier 30 shown. The ticket record would correspond to one or more outcome records 6 in respect of which the ticket had been purchased. The corresponding outcome ID 20 would likely be included in relation to the ticket record 8, so that the ticket record 8 could be linked back to the selected wager events that were desired to be purchased by the purchaser at the time that the purchase of the ticket was completed in the ticket record 8 was created. Finally shown are the purchaser details 31 which could be the identity or other details required to match the corresponding ticket record to the details of the purchaser stored within the account funding system 13, to facilitate the refund of earnings from paying wagers in respect of which winning tickets were purchased. The purchaser details 31, along with other security or authentication data which might be tracked in respect of individual ticket purchasers will all be understood to be within the scope of the present invention. The purchaser details 31 could be any necessary information to allow for the linkage of a particular ticket record with a user account on the account funding system 13.

It is also possible that the ticket record 8 would include additional identification or verification information respect of the purchaser of a particular ticket in order for the method of the present invention to satisfy gaming regulations and requirements in particular jurisdictions where the method of the present invention was made available and the addition of this type of an identity verification structure or data set to the ticket database 7 will also be understood to be encompassed within the scope hereof.

Client Devices:

The method of the present invention explicitly contemplates the use of network enabled mobile client devices 3 by customers to initiate purchase transactions in accordance with the remainder of the method. FIG. 3 shows a sample of client devices 3 which could be used in accordance with the model of the present invention. The client devices 3 shown include a smart phone or a tablet, or a larger format screen or a kiosk which could be used by multiple purchasers to purchase tickets in a group environment. It will be understood by those skilled in the art of client/ticketing server application design and the like that any type of a device which could communicate with the ticketing server 1 via a network and the related network interface would be within the scope of the present invention.

The client device could include pre-existing software, such as a browser for example, which could be used to facilitate the method of the present invention, or in other cases, specific purpose built client software could be used. Architecturally and conceptually, the concept of "apps" used on smart phones and other personal devices as a front end to centrally hosted systems is widely known. Where an interface is provided on the client device 3, the user of the client device 3 could interact with the system and the ticketing server 1 of the present invention by sending and receiving information between the interface of the client device 3 and the ticketing server using Internet communication protocols or the like between the client device 3 and the ticketing server 1. The specifics of implementing the client/ticketing server software system using a website or at a central bureau and an interface on the client device will be easily understood by those skilled in the art of client/ticketing server software design and the method of implementation of such a similar approach is contemplated within the scope of the present invention.

Development of either a browser interface or a local app interface as the user interface between the customer at the client device 3 and the ticketing server 1, and the remainder of the centrally located method and architecture of the present invention, will be understood to those skilled in the art of client/ticketing server database and application design and all such approaches are contemplated within the scope of the present invention.

Results Interface:

The system of the present invention will require a results interface 9 to competition results through which wager event outcomes could be captured. Basically in the process of the interval closing process to identify paying wagers and out winning tickets the system of the present invention requires data corresponding to wager events or team and player based occurrences which took place in a particular scoring interval of a sports competition in respect of which the method of the present invention is being run. Interface to competition results could comprise a manual data entry form through which the operator of the server 1 could manually enter the outcomes of particular potential wager events in the scoring interval etc. or in other embodiments of the method of the present invention the results interface 9 to competition results could comprise an electronic interface via the network interface 2 with the server 1 i.e. a statistical sports interface which may already have all the necessary information responding to particular team based on player based occurrences within scoring intervals in the competition in question which could be used for the purpose of determining paying wagers etc.

Account Funding System:

Various types of account funding systems 13 could be used in conjunction with the server 1 of the present invention to effect the charging for wager amounts for the sale of tickets in accordance with the method of the present invention as well as to facilitate the refund of pool proceeds back to a ticket purchaser when they were successful in a winning ticket purchase for a paying wager. The account funding system 13 could either be an integrated hardware or software solution with the server, or a remote service in network communication with the server 1. Both such approaches are contemplated within the scope of the present invention. It is specifically contemplated that in many embodiments of the system and method of the present invention the account funding system 13 would be a pre-existing account management system used to manage user accounts and funding deposits and refunds in a pre-existing sports book architecture.

Local or Distributed Sales:

As outlined above, it is intended that the method of the present invention could either be used for operation of a single venue and single sporting event sports pool competition and wagering method, or in other circumstances it may be desirable using a network connected server on a wide area network to allow for the purchase of pool tickets in one or more pools being administered in accordance with the present invention from multiple permitted locations. For example, in a local embodiment, the system could allow the conduct of a sports pool amongst the group of friends in a single location who were all participating while they watched a sporting event. In other cases, the system might permit the purchase of pool tickets by purchasers in multiple locations or jurisdictions, so long as it was permitted, resulting in a very large customer audience and a large pool of purchasers—resulting in the potential for large amounts of ticket sales and high aggregate wager pool amounts.

Purchaser Interface:

Various types of interfaces could be used to facilitate the sale of tickets to purchasers using their client devices 3—it is contemplated that the most likely software interface in such a client/server environment will be the provision of a website which could be used with a browser of the purchaser to interact with the server 1 for data entry including the selection of the desired outcome records 6 to be associated with the tickets sold and to then subsequently facilitate the secure data entry of purchaser details or other information for use by the account funding system 13. Most client devices 3 which comprise mobile devices already have a web browser software installed there which would make it easily scalable and rapid to deploy the method of the present invention to a large number of customers, purchasers who typically already had a mobile device in their pocket will be able to connect and communicate for the purpose of purchasing tickets or participating in the method. In certain other embodiments of the method of the present invention may be desired to create a standalone locally installed application for the purpose of participating in the ticket purchase and redemption method of the present invention by a purchaser.

It is specifically contemplated that the communications network which would be used for communication between the ticketing server 1 and the mobile client devices 3 of customers would be the Internet or another publicly available wide area network. The specific protocol of communication between the various devices could vary, and differing communication protocols could be used between different devices in the system—all such approaches and architectures will be understood to those skilled in the art of wide area computer network design and all such approaches are contemplated within the scope of the present invention. In certain embodiments of the system and method of the present invention more than one communications network might be used. The ticketing server 1, client devices 3, as well as any sports information interface 9 and account funding systems 13 which were networked would need to each comprise a network interface capable of communicating with the at least one communications network contemplated within the scope of the remainder of the present invention.

It is explicitly contemplated that the system and method of the present invention could be delivered as a service bureau type of a product whereby the provider of the pool service and the infrastructure of the present method could provide service to multiple gaming venues or multiple customers and operators of venues. It is as such explicitly contemplated that embodiments of the method and the server of the present invention would explicitly incorporate any necessary security and other configuration modifications to allow for compartmentalized operation and transaction processing by the system and method of the present invention on behalf of multiple providers and multiple groups of pool ticket purchasers. The incorporation of such a security model to the database and software of the present invention will be understood to those skilled in the art and is explicitly contemplated within the scope of the present invention.

Sample Operations:

In concluding this detailed description of the illustrated embodiments of the invention, it is desired to provide some sample understanding of the operation of the gaming method of the present invention. For the purpose of demonstration of some sample executions and iterations of the method, the game and wager events outlined in FIG. 1 are relied upon below.

FIG. 7 shows a sample table which might represent the type of information retained within an outcome database 5 in accordance with the remainder of the invention corresponding to the game and wager events outlined in the matrix of FIG. 1. A total of 20 outcome records 6 are shown. For the sake of demonstration the game ID 21 and the interval ID 22 are both shown as corresponding to a static number. It will be understood that in a full data set, the outcome records 6, whether they were repeated from interval to interval or whether they were randomly or otherwise reset for interval to interval, would be repeated in the table such that for example in a four quarter football game there might be 80 outcome records 6 instead of the 20 shown.

The table shows the wager event type 23, four team-based and player-based wager events as well as the details of the wager event itself. Also shown is the wager amount stipulated 24. The wager amount 24 is effectively the price that would be attached to the purchase of the ticket corresponding to that particular outcome record for the assigned game and interval. For example purchasing a ticket to bet upon team one scoring field goal would cost $20.

Referring to FIG. 8 there are shown for sample ticket records 8 corresponding to four pool tickets sold in respect of the method of the present invention. In addition to the ticket ID 30, the related outcome records 6 are seen by reference to their outcome IDs 20 corresponding to the outcome records demonstrated in FIG. 7. The purchaser details 31 shown for each ticket represented by the ticket records 6 in this Figure simply show a generic purchaser name and the like through which the payment gateway could pay winning proceeds amounts. The sale of the four tickets outlined in FIG. 8 results in a total collected proceeds of $95. Ticket 1 would cost $20 to place, ticket 2 would cost $45 to place with wagers on three different wager events, ticket 3 would cost $5 to place on a single wager event, and ticket forward cost $25 to place on two wager events.

In a first execution of the first interval of the competition for which these tickets correspond as shown in the data set of FIG. 7, for the purpose of demonstrating the method of an interval closing process we will assume that team one scores a field goal and the quarterback represented by outcome record 9 participated in a scoring play. There is no scoring for the second team in this interval. On the basis of this outcome in the interval, outcome records 1 and 3 represent paying wagers.

Using a sample distribution method it is posited that the predetermined formula for calculating the house proceeds portion of the total proceeds amount of $95 is to allocate 10% of the total proceeds amount to the house, namely $9.50. This leaves a total of $85.50 for allocation to winning tickets.

There are two winning tickets related to this interval represented in the data set, identified by numbers 1 and 2 each purchased a ticket in respect of outcome record 1 at a $20 wager amount. A single ticket was purchased in respect of outcome record 9 at a $5 ticket purchase price. For the sake of demonstrating a sample formula for proceeds distribution, we will posit a percentage based distribution of the player proceeds portion as follows:

Ticket 1—$20 winning ticket on one paying wager: 44.4%—pays $37.96

Ticket 2—$25 winning ticket ($20 and $5) on two paying wagers: 55.6%—pays $47.54

Following the closure of the interval and the completion of the above calculations the two payouts in the amount of $37.96 and $47.54 would be refunded to the purchaser details 31 of each of the purchasers represented in ticket records 1 and 2 shown in FIG. 8.

In a second sample iteration of an interval in the same football game outlined in the matrix of FIG. 1, the same four tickets are sold in interval 1 of the game. The sale of the four tickets outlined in FIG. 8 results in a total collected proceeds of $95.

In the interval corresponding to these ticket records 8 there is no scoring in the game. As such there are no paying wagers. The house proceeds portion, again for demonstrative purposes calculated at a flat 10% fee, of $9.50 could be calculated and reserved to the house. The remaining $85.50 player proceeds portion would be carried forward to the next interval of the corresponding game and included in the pot for the next interval, since there was no scoring in the interval in respect of which pool tickets were sold.

If the same four tickets were sold again for the second interval, resulting in the collection of an additional total collected proceeds of $95. Ticket 1 would cost $20 to place, ticket 2 would cost $45 to place with wagers on three different wager events, ticket 3 would cost $5 to place on a single wager event, and ticket forward cost $25 to place on two wager events.

For the purpose of demonstrating the method of an interval closing process we will assume that in the second interval team one scores a field goal and the quarterback represented by outcome record 9 participated in a scoring play. There is no scoring for the second team in this interval.

On the basis of this outcome in the interval, outcome records 1 and 3 represent paying wagers.

The total proceeds amount for the second interval would be $185.50, being the $95 in total proceeds for tickets sold related to that interval plus the $85.50 carried forward from the preceding interval which had no paying wagers. Using the same 10% house the calculation, the house proceeds portion would be $18.55, leaving a total player proceeds portion for distribution of $161.95.

There are two winning tickets related to this interval represented in the data set, identified by numbers 1 and 2 each purchased a ticket in respect of outcome record 1 at a $20 wager amount. A single ticket was purchased in respect of outcome record 9 at a $5 ticket purchase price. For the sake of demonstrating a sample formula for proceeds distribution, we will posit a percentage based distribution of the player proceeds portion as follows:

Ticket 1—$20 winning ticket on one paying wager: 44.4%—pays $71.91

Ticket 2—$25 winning ticket ($20 and $5) on two paying wagers: 55.6%—pays $90.04

As also described above, if in the final chronological intra-game scoring interval of a competition there is no paying wagers identified in the outcome records following the closure of the interval, the entire total proceeds amount goes to the house.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

In addition, it will be apparent to those of skill in the art that by routine modification the present invention can be optimized for use in a wide range of conditions and application. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept.

The invention claimed is:

1. A method of conducting an electronically-facilitated event-based sports pool in conjunction with a subject sports competition comprised of two multi-player teams competing within a plurality of intra-game scoring intervals, said method comprising:
   a. providing a ticketing server comprising:
      i. a network connection permitting communication with client devices of pool ticket purchasors;
      ii. a ticketing software component for administering the method and communicating with client devices to facilitate the sale of pool tickets;
      iii. an outcome database comprised of a plurality of outcome records each corresponding to a potential wager event for a team or a player of a team within a scoring interval in the competition, wherein:
         1. there is at least one outcome record for each scoring interval of the competition and there is a wager value assigned to each outcome record; and
         2. the outcome database includes at least one outcome record corresponding to a team-based wager event for each scoring interval in the competition, and at least one player-based wager event for each scoring interval in the competition;
      iv. a results interface through which intra-game scoring results corresponding to wager events can be captured for the subject sports competition;
      v. a purchaser interface to an account funding system, through which wager payments and winning wager amounts can be received, processed and disbursed on behalf of individual purchasers of pool tickets in accordance with the remainder of the method; and
      vi. a ticket database comprised of ticket records each corresponding to a pool ticket sold corresponding to an outcome record and wager value, and including purchaser details linking the ticket sold to an individual purchaser via the purchaser interface,
   b. selling pool tickets in respect of each scoring interval in the competition to purchasors up until the time of commencement of said scoring interval by, in respect of each pool ticket sold, using the ticketing server in communication with a client device to:
      i. permit the purchaser to furnish sold ticket particulars namely at least one outcome record representing a wager for a yet-to-commence scoring interval, along with capturing purchasor details corresponding to the individual purchaser on the purchaser interface;
      ii. capturing payment for the aggregate wager amount for all of the selected outcome records from the purchaser via the purchaser interface, using the captured purchaser details;
      iii. storing the sold ticket particulars of the sold ticket to a ticket record in the ticket database; and
      iv. associating the at least one outcome record for at least one yet-to-commence scoring interval with the ticket being sold, and
   c. as the competition progresses, conducting an interval closing step following the conclusion of each intra-game scoring interval, being a closed interval, said interval closing step comprising:
      i. using the actual scoring statistics for the competition, identifying the occurrence of any wager event having occurred within the closed interval corresponding to an outcome record for the closed interval in the outcome database, any such wager event having occurred representing a paying wager;
      ii. determining the total wager pool for the closed interval, being the total wager amounts for all pool tickets sold in respect of the closed interval plus any retained player proceeds portion from the chronologically preceding scoring intervals where there were no winning tickets paid out in relation to paying wagers;
      iii. calculating a house proceeds portion of the total wager pool for the closed interval based upon a predetermined formula, wherein the house proceeds portion is retained by the operator of the pool;
      iv. calculating a player proceeds portion of the total wager pool for the closed interval, being the remainder of the total wager pool net of the house proceeds portion; and
      v. paying out the player proceeds portion as follows:
         1. if no paying wagers are identified in respect of the closed interval, the player proceeds portion is retained for distribution in respect of the next chronologically following scoring interval;

2. if at least one paying wager is identified in respect of the closed interval:
   a. if there are no sold pool tickets in respect of any identified paying wagers, the player proceeds portion is retained for distribution in respect of the next chronologically following scoring interval; and
   b. if there are sold pool tickets in relation to the closed interval in respect of at least one paying wager:
      i. allocating the player proceeds portion to each sold pool ticket corresponding to a paying wager using a predetermined formula based upon the number of winning tickets sold and the wager amount of each sold ticket, each allocated amount of the player proceeds portion being a ticket payout amount; and
      ii. facilitating electronic payout of the ticket payout amount for each winning ticket to the purchasor of same via the purchaser interface using the payment details stored within the corresponding ticket record,
wherein if there are no paying wagers identified in the last chronological scoring interval in the competition, the total wager pool including any retained player proceeds portion from the chronologically preceding scoring interval are retained by the operator of the pool; and
wherein multiple sold pool tickets can correspond to a particular outcome record.

2. The method of claim 1 wherein the purchaser interface comprises a connection to a purchaser account system used for the processing of wagers in multiple sports or games in a traditional sports betting enterprise, wherein an account balance is maintained for individual purchasors with wager amounts deducted therefrom in favour of the house and ticket payout amounts are credited thereto in favour of the individual purchaser.

3. The method of claim 1 wherein an individual pool ticket can be sold for play in only one scoring interval in the competition.

4. The method of claim 1 wherein an individual pool ticket can be sold for play in more than one scoring interval in the competition, wherein:
   a. the purchaser of such a ticket is charged the aggregate wager amount for the ticket for each scoring interval to which it is desired to apply the ticket via the purchaser interface; and
   b. the same outcome records will be used in respect of the ticket for each applicable scoring interval to determine the existence of winning wagers.

5. The method of claim 1 wherein a potential wager event for a player of a team in respect of which an outcome record is created is the participation of a particular team player in a scoring play.

6. The method of claim 1 wherein a potential wager event for a team in respect of which an outcome record is created is the occurrence of a particular type of team scoring play.

7. The method of claim 1 wherein the outcome database is pre-populated with outcome records for all of the scoring intervals in the competition whereby a purchaser can purchase tickets for each scoring interval in the competition, before the commencement of the competition, in a single purchase transaction.

8. The method of claim 1 wherein the ticketing server will facilitate the display of a matrix of available outcome records in respect of which pool tickets can be sold to a human interface of a client device.

9. The method of claim 8 wherein the client device comprises a smart phone, tablet or personal computer of a purchasor.

10. The method of claim 8 wherein the client device comprises an interactive kiosk or computer display allowing for the use of the client by multiple purchasors in a group environment, whereby multiple purchasors can purchase pool tickets from the same client device.

11. The method of claim 1 wherein the ticketing server is a Web ticketing server.

12. The method of claim 1 wherein the same potential wager events for a team or a player of a team within a scoring interval in the competition are used for the generation of outcome records for each scoring interval in the competition.

13. The method of claim 1 wherein different potential wager events for a team or a player of a team within a scoring interval in the competition are used for the generation of outcome records for each scoring interval in the competition.

14. The method of claim 1 wherein each scoring interval in a competition is a period of play in the competition.

15. The method of claim 1 wherein the team competition is selected from sports games of the sports of hockey, football, baseball.

16. The method of claim 1 wherein the number of competitions in respect of which the ticketing server can offer pool tickets for sale is one.

17. The method of claim 1 wherein the number of competitions in respect of which the ticketing server can offer pool tickets for sale is more than one.

18. The method of claim 1 wherein the results is a manual entry human interface through which an operator can enter the scoring results on closure of a scoring interval.

19. The method of claim 1 wherein the results interface is a network interface or connection to a computer system containing and providing said results.

20. A ticketing server for the conduct of an electronically-facilitated event-based sports pool in conjunction with a subject sports competition comprised of two multi-player teams competing within a plurality of intra-game scoring intervals, said ticketing server comprising:
   a. a network connection permitting communication with client devices of pool ticket purchasors;
   b. a ticketing software component for administering the method and communicating with client devices to facilitate the sale of pool tickets;
      i. an outcome database comprised of a plurality of outcome records each corresponding to a potential wager event for a team or a player of a team within a scoring interval in the subject sports competition, wherein:
         1. there is at least one outcome record for each scoring interval of the competition and there is a wager value assigned to each outcome record; and
         2. the outcome database includes at least one outcome record corresponding to a team-based wager event for each scoring interval in the competition, and at least one player-based wager event for each scoring interval in the competition;
   c. a results interface through which intra-game scoring results corresponding to wager events can be captured for the subject sports competition;
   d. a purchaser interface to an account funding system, through which wager payments and winning wager amounts can be received, processed and disbursed on behalf of individual purchasers of pool tickets in accordance with the remainder of the method; and
e. a ticket database comprised of ticket records each corresponding to a pool ticket sold corresponding to an outcome record and wager value, and including purchaser details linking the ticket sold to an individual purchaser via the purchaser interface, wherein said ticketing server can be used in the method by:
a) selling pool tickets in respect of each scoring interval in the subject sports competition to purchasors up until the time of commencement of said scoring interval by, in respect of each pool ticket sold, in communication with a client device:
  i. permit the purchaser to furnish sold ticket particulars namely at least one outcome record representing a wager for a yet-to-commence scoring interval, along with capturing purchasor details corresponding to the individual purchaser on the purchaser interface;
  ii. capturing payment for the aggregate wager amount for all of the selected outcome records from the purchaser via the purchaser interface, using the captured purchaser details;
  iii. storing the sold ticket particulars of the sold ticket to a ticket record in the ticket database; and
  iv. associating the at least one outcome record for at least one yet-to-commence scoring interval with the ticket being sold;
b) as the subject sports competition progresses, conducting an interval closing step following the conclusion of each intra-game scoring interval, being a closed interval, said interval closing step comprising:
  i. using the actual scoring statistics for the subject sports competition, identifying the occurrence of any wager event having occurred within the closed interval corresponding to an outcome record for the closed interval in the outcome database, any such wager event having occurred representing a paying wager;
  ii. determining the total wager pool for the closed interval, being the total wager amounts for all pool tickets sold in respect of the closed interval plus any retained player proceeds portion from the chronologically preceding scoring intervals where there were no winning tickets paid out in relation to paying wagers;
  iii. calculating a house proceeds portion of the total wager pool for the closed interval based upon a predetermined formula, wherein the house proceeds portion is retained by the operator of the pool;
  iv. calculating a player proceeds portion of the total wager pool for the closed interval, being the remainder of the total wager pool net of the house proceeds portion; and
  v. paying out the player proceeds portion as follows:
    1. if no paying wagers are identified in respect of the closed interval, the player proceeds portion is retained for distribution in respect of the next chronologically following scoring interval;
    2. if at least one paying wager is identified in respect of the closed interval:
      a. if there are no sold pool tickets in respect of any identified paying wagers, the player proceeds portion is retained for distribution in respect of the next chronologically following scoring interval; and
      b. if there are sold pool tickets in relation to the closed interval in respect of at least one paying wager:
        i. allocating the player proceeds portion to each sold pool ticket corresponding to a paying wager using a predetermined formula based upon the number of winning tickets sold and the wager amount of each sold ticket, each allocated amount of the player proceeds portion being a ticket payout amount; and
        ii. facilitating electronic payout of the ticket payout amount for each winning ticket to the purchasor of same via the purchaser interface using the payment details stored within the corresponding ticket record, wherein if there are no paying wagers identified in the last chronological scoring interval in the subject sports competition, the total wager pool including any retained player proceeds portion from the chronologically preceding scoring interval are retained by the operator of the pool; and wherein multiple sold pool tickets can correspond to a particular outcome record.

21. The ticketing server of claim 20 wherein the purchaser interface comprises a connection to a purchaser account system used for the processing of wagers in multiple sports or games in a traditional sports betting enterprise, wherein an account balance is maintained for individual purchasors with wager amounts deducted therefrom in favour of the house and ticket payout amounts are credited thereto in favour of the individual purchaser.

22. The ticketing server of claim 20 wherein an individual pool ticket can be sold for play in only one scoring interval in the competition.

23. The ticketing server of claim 20 wherein an individual pool ticket can be sold for play in more than one scoring interval in the competition, wherein:
a. the purchaser of such a ticket is charged the aggregate wager amount for the ticket for each scoring interval to which it is desired to apply the ticket via the purchaser interface; and
b. the same outcome records will be used in respect of the ticket for each applicable scoring interval to determine the existence of winning wagers.

24. The ticketing server of claim 20 wherein the ticketing server will facilitate the display of a matrix of available outcome records in respect of which pool tickets can be sold to a human interface of a client device.

25. The ticketing server of claim 20 wherein the client device comprises a smart phone, tablet or personal computer of a purchasor.

26. The ticketing server of claim 20 wherein the client device comprises an interactive kiosk or computer display allowing for the use of the client by multiple purchasors in a group environment, whereby multiple purchasors can purchase pool tickets from the same client device.

27. The ticketing server of claim 20 wherein the results interface is a manual entry human interface through which an operator can enter the scoring results on closure of a scoring interval.

28. The ticketing server of claim 20 wherein the results interface is a network interface or connection to a computer system containing and providing said results.

29. The ticketing server of claim 20 wherein the ticketing server is a Web ticketing server.

30. The ticketing server of claim 20 wherein the number of subject sports competitions in respect of which the ticketing server can offer pool tickets for sale is one.

31. The ticketing server of claim 20 wherein the number of subject sports competitions in respect of which the ticketing server can offer pool tickets for sale is more than one.

* * * * *